UNITED STATES PATENT OFFICE.

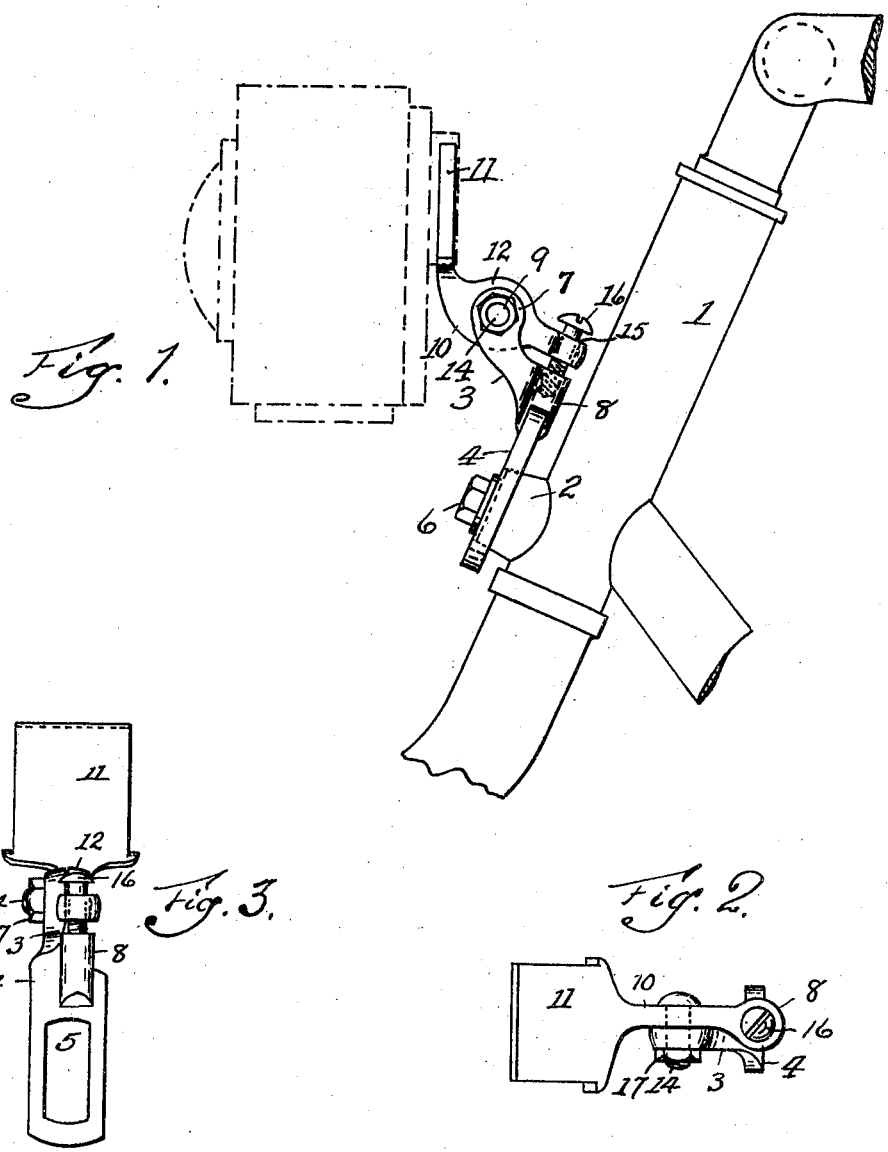

WILLIAM G. SCHAEFFER, OF READING, PENNSYLVANIA, ASSIGNOR TO WILLIAM F. REMPPIS, OF READING, PENNSYLVANIA.

ADJUSTABLE LAMP-BRACKET.

No. 821,749.　　　　Specification of Letters Patent.　　　　Patented May 29, 1906.

Application filed February 3, 1906. Serial No. 299,304.

*To all whom it may concern:*

Be it known that I, WILLIAM G. SCHAEFFER, a citizen of the United States, residing at Reading, in the county of Berks and State of Pennsylvania, have invented new and useful Improvements in Adjustable Lamp-Brackets, of which the following is a specification.

This invention relates to improvements in lamp-brackets; and the object of the present invention is to provide a device whereby a lamp may be adjustably secured to a bicycle or other vehicle in such a manner that the means of adjustment may be easy of access and at the same time of such a construction that the rays from the lamp may be set to any angle.

The objection heretofore to adjusting means has been that the points of adjustment have been predetermined by serrated surfaces or notches, and if these serrations were made small enough to allow adjustment to all points they would not stand the wear to which they were subjected, while if they were made sufficiently large to stand the usual wear the distance between points of possible adjustment has been too great. I overcome these objections by my present construction and in a comparatively simple manner, which will be fully explained in the following specification and clearly illustrated in the accompanying drawings, in which—

Figure 1 shows my device in position on a bicycle-head. Fig. 2 is a plan view, and Fig. 3 is a rear elevation, of my device.

The numeral 1 designates a portion of a bicycle-frame or other vehicle part to which it is desired to attach the bracket. This frame portion is formed with a suitable projection or lug 2, and on this lug the bracket is fastened.

The bracket is composed of two members 3 and 10. The one member 3 is formed with a body portion 4, having an oblong slot 5 therein, which slot is adapted to fit over the lug 2 on the frame above described. This portion of the bracket is secured to the frame by means of a screw 6. This member 3 is formed with an angled end or ear 7 and an internally-screw-threaded lug 8 on its top. The ear 7 has an opening 9 therein.

The member 10 is formed with a blade portion 11, adapted to receive the lamp, and an approximately right-angled portion 12, which portion has an opening 13 at its center adapted to register with an opening 9 in the ear 7 of the opposite member. A bolt 14 passes through these openings and serves to hold them in a secure position after being adjusted. The extreme rear end of the portion 12 is formed with an opening 15 at right angles to the opening 13 and in alinement with the lug 8 on the opposite member. A screw 16 passes through this opening 15 and enters the threaded opening in the lug 8.

When the bracket is in position, adjustment of the device is secured by turning the screw 16. When the proper angle has been secured, the nut 17 on the bolt 14 is then tightened, and the adjustment is made permanent.

Having thus described my invention, what I claim, and desire to secure by Letters Patent, is—

An adjustable lamp-bracket for bicycles or like vehicles comprising two members pivotally joined together by means of a bolt and nut, one member having a perforated right-angled ear, a slotted body portion and an internally-screw-threaded lug at its top, the other member having a lamp-carrying blade, a perforated angled portion adapted to be pivotally connected to said ear and an opening in its extreme rear end at right angles to said perforation and an adjusting-screw adapted to pass through said opening and enter the said screw-threaded lug on the first-named member, substantially as and for the purpose described.

In testimony whereof I affix my signature in presence of two subscribing witnesses.

WILLIAM G. SCHAEFFER.

Witnesses:
W. A. C. OAKS,
ED. A. KELLY.